US009689676B2

(12) United States Patent
Neul et al.

(10) Patent No.: US 9,689,676 B2
(45) Date of Patent: *Jun. 27, 2017

(54) YAW-RATE SENSOR

(71) Applicant: ROBERT BOSCH GMBH, Stuttgart (DE)

(72) Inventors: Reinhard Neul, Stuttgart (DE); Johannes Classen, Reutlingen (DE); Torsten Ohms, Vaihingen an der Enz-Aurich (DE); Burkhard Kuhlmann, Reutlingen (DE); Axel Franke, Wannweil (DE); Oliver Kohn, Reutlingen (DE); Daniel Christoph Meisel, Reutlingen (DE); Joerg Hauer, Reutlingen (DE); Udo-Martin Gomez, Leonberg (DE); Kersten Kehr, Zwota (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/737,971

(22) Filed: Jun. 12, 2015

(65) Prior Publication Data

US 2015/0276408 A1    Oct. 1, 2015

Related U.S. Application Data

(63) Continuation of application No. 12/734,228, filed as application No. PCT/EP2008/063228 on Oct. 2, 2008, now Pat. No. 9,081,027.

(30) Foreign Application Priority Data

Nov. 15, 2007   (DE) .......................... 10 2007 054 505

(51) Int. Cl.
  *G01C 19/56*   (2012.01)
  *G01C 19/574*   (2012.01)
  (Continued)

(52) U.S. Cl.
  CPC ............ *G01C 19/574* (2013.01); *F16F 1/025* (2013.01); *G01C 19/5747* (2013.01); *G01P 3/44* (2013.01)

(58) Field of Classification Search
  CPC ......................... G01C 19/574; G01C 19/5747
  (Continued)

(56) References Cited

U.S. PATENT DOCUMENTS 4,656,383 A   4/1987  Albert
4,790,192 A   12/1988 Knecht et al.
(Continued)

FOREIGN PATENT DOCUMENTS

DE   196 41 284     5/1998
DE   69320207 T2    1/1999
(Continued)

OTHER PUBLICATIONS

J. Bernstein et al., "A Micromachined Comb-Drive Tuning Fork Rate Gyroscope," The Charles Draper Laboratory, 0-7803-0957-2/93, 1993 IEEE.
(Continued)

*Primary Examiner* — John Chapman, Jr.
(74) *Attorney, Agent, or Firm* — Gerard Messina

(57) ABSTRACT

A yaw-rate sensor having a substrate and a plurality of movable substructures that are mounted over a surface of the substrate, the movable substructures being coupled to a shared, in particular, central spring element, means being provided for exciting the movable substructures into a coupled oscillation in a plane that extends parallel to the surface of the substrate, the movable substructures having (Continued)

Coriolis elements, means being provided for detecting deflections of the Coriolis elements induced by a Coriolis force, a first Coriolis element being provided for detecting a yaw rate about a first axis, a second Coriolis element being provided for detecting a yaw rate about a second axis, the second axis being oriented perpendicularly to the first axis.

14 Claims, 12 Drawing Sheets

(51) Int. Cl.
  *F16F 1/02* (2006.01)
  *G01P 3/44* (2006.01)
  *G01C 19/5747* (2012.01)

(58) Field of Classification Search
  USPC .................................................. 73/504.12
  See application file for complete search history.

(56) References Cited

U.S. PATENT DOCUMENTS

| | | | |
|---|---|---|---|
| 5,016,072 A | 5/1991 | Greiff | |
| 5,289,721 A | 3/1994 | Tanizawa et al. | |
| 5,326,726 A | 7/1994 | Tsang et al. | |
| 5,331,853 A | 7/1994 | Hulsing | |
| 5,349,855 A | 9/1994 | Bernstein et al. | |
| 5,359,893 A | 11/1994 | Dunn | |
| 5,396,797 A | 3/1995 | Hulsing | |
| 5,569,856 A | 10/1996 | Jacobs-Cook | |
| 5,604,312 A | 2/1997 | Lutz | |
| 5,761,957 A | 6/1998 | Oba et al. | |
| 5,895,850 A | 4/1999 | Buestgens | |
| 6,044,707 A | 4/2000 | Kato | |
| 6,282,956 B1 | 9/2001 | Okada | |
| 6,539,803 B2 | 4/2003 | Mochida | |
| 7,104,129 B2 | 9/2006 | Nasiri et al. | |
| 7,168,317 B2 | 1/2007 | Chen et al. | |
| 7,250,112 B2 | 7/2007 | Nasiri et al. | |
| 7,458,263 B2 | 12/2008 | Nasiri et al. | |
| 7,617,728 B2 | 11/2009 | Cardarelli | |
| 7,694,563 B2 | 4/2010 | Durante et al. | |
| 7,885,423 B2 | 2/2011 | Weigold | |
| 8,176,779 B2 | 5/2012 | Blomqvist | |
| 8,250,921 B2 | 8/2012 | Nasiri et al. | |
| 8,534,127 B2 | 9/2013 | Seeger et al. | |
| 8,633,049 B2 | 1/2014 | Nasiri et al. | |
| 9,081,027 B2* | 7/2015 | Neul | G01C 19/574 |
| 2002/0088279 A1 | 7/2002 | Folkmer et al. | |
| 2004/0211257 A1 | 10/2004 | Geen | |
| 2005/0092085 A1 | 5/2005 | Chen et al. | |
| 2007/0125161 A1 | 6/2007 | Bryzek et al. | |
| 2007/0220973 A1 | 9/2007 | Acar | |
| 2008/0276706 A1 | 11/2008 | Hartmann et al. | |

FOREIGN PATENT DOCUMENTS

| | | |
|---|---|---|
| DE | 102004042761 A1 | 3/2005 |
| DE | 60032373 T2 | 10/2007 |
| EP | 0 606 725 A1 | 7/1994 |
| JP | 2004-163376 | 6/2004 |
| JP | 2007-71677 | 3/2007 |
| JP | 2007-155489 | 6/2007 |
| JP | 2008-514968 | 5/2008 |
| WO | WO 95/34798 | 12/1995 |
| WO | WO 02/066929 | 8/2002 |
| WO | WO 2006/034706 | 4/2006 |
| WO | WO 2006/070059 | 7/2006 |
| WO | WO 2008/051677 | 5/2008 |

OTHER PUBLICATIONS

M.B. Cohn et al., "Wafer-to-wafer transfer of microstructures for vacuum packaging," Proc. IEEE Solid-State Sensor and Actuator Workshop, Hilton Head, SC, Jun. 1996, pp. 32-35.

W. Chi-Keung Tang, "Electrostatic Comb Drive for Resonant Sensor and Actuator Applications," Dissertation, Doctor of Philosophy in Electrical Engineering and Computer Sciences, Nov. 21, 1990, pp, 1-229, University of California at Berkeley.

J. Bustillo et al., "Surface Micromachining for Microelectromechanical Systems," Proceedings of the IEEE, Aug. 1998, pp. 1552-1574, 86-8.

\* cited by examiner

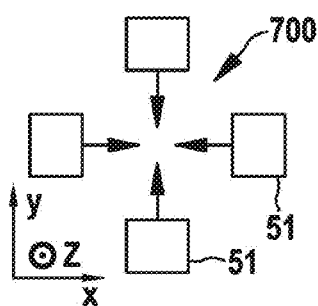
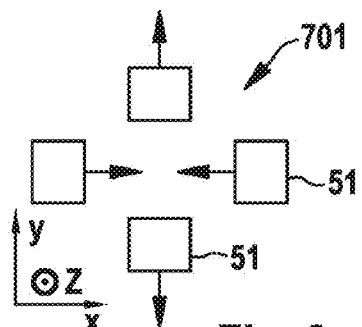
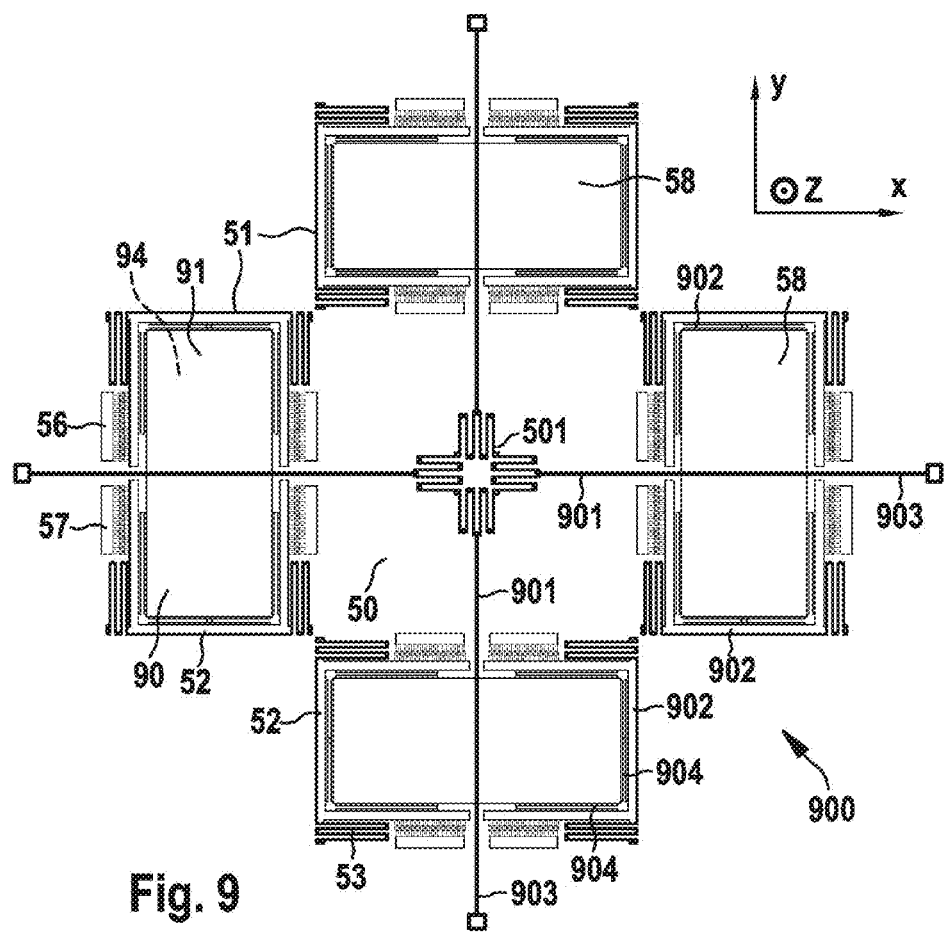

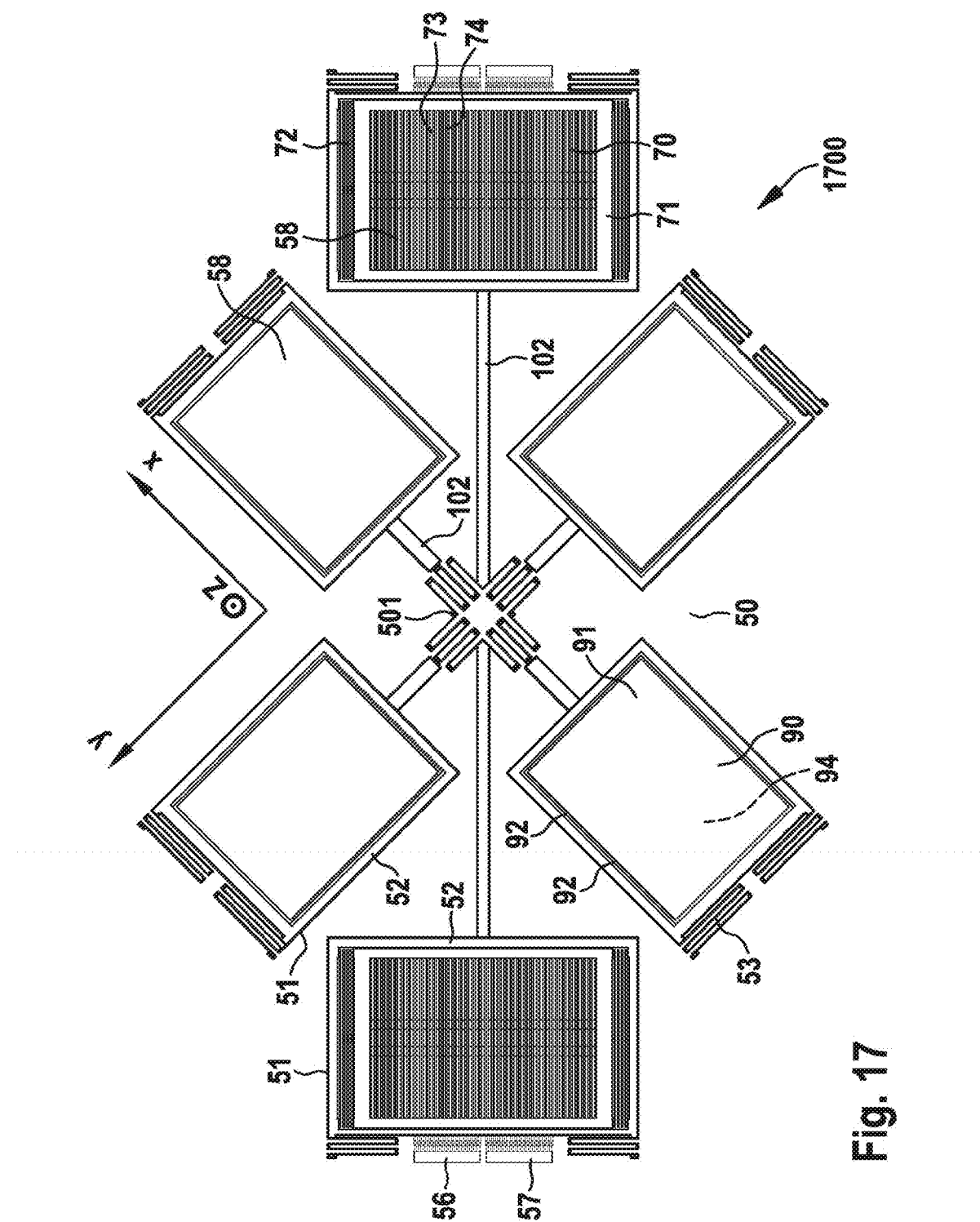

YAW-RATE SENSOR

CROSS-REFERENCE TO RELATED APPLICATIONS

The present application is a continuation application of U.S. patent application Ser. No. 12/734,228, filed on Nov. 28, 2011, which is a national phase of International Patent Application No. PCT/EP2008/063228, filed Oct. 2, 2008, and claims priority to German Patent Application No. DE 10 2007 054 505.5, filed on Nov. 15, 2007, all of which are hereby incorporated herein by reference in their entireties.

FIELD OF THE INVENTION

The present invention relates to a yaw-rate sensor.

BACKGROUND

Linearly oscillating yaw-rate sensors are generally known. In these yaw-rate sensors, parts of the sensor structure are actively set into oscillation (primary oscillation) in one direction, i.e., along a first axis (x-axis) that is oriented parallel to a substrate surface. In response to an external yaw rate about one particular sensitive axis, Coriolis forces act on the oscillating parts of the sensor structure. These Coriolis forces, which vary periodically with the frequency of the primary oscillation, induce oscillations in parts of the sensor structure (secondary oscillation) in the direction of a second axis that is oriented perpendicularly to the x-axis. The second axis can be oriented parallel to the substrate surface or perpendicularly to the substrate surface. Detection means, which capacitively sense the secondary oscillation via electrodes, are mounted on the sensor structure.

To an increasing degree, applications demand yaw-rate sensors that are capable of detecting yaw rates about a plurality of mutually perpendicularly extending axes. Till now, this has been accomplished by placing a plurality of monoaxial sensors laterally or vertically side-by-side. However, in terms of costs, space requirements, power requirements, and the relative orientation accuracy of the axes, there are disadvantages entailed in using a plurality of monoaxial yaw-rate sensors.

Furthermore, biaxial yaw-rate sensors are known from the related art which are capable of detecting yaw rates about two mutually perpendicularly extending axes that are oriented parallel to the substrate surface.

SUMMARY

An object of the present invention is to devise an improved biaxial yaw-rate sensor that is capable of sensing yaw rates about two mutually perpendicularly extending spatial axes. It is also an object of the present invention to devise a triaxial yaw-rate sensor that is capable of sensing yaw rates about all three spatial axes.

The present invention provides that the yaw-rate sensor have a plurality of movable substructures that are mounted over a surface of the substrate. The substructures are coupled via a shared, in particular, central spring element and may be excited into a coupled oscillation in a plane that extends parallel to the surface of the substrate. Each of the substructures has one or more Coriolis elements that are provided for detecting deflections induced by a Coriolis force.

Because the substructures are mechanically coupled, the yaw-rate sensor advantageously has a defined, shared drive mode and, therefore, requires only one drive control circuit. This reduces the space and power requirements for the electronic evaluation circuit.

In one preferred specific embodiment, two substructures of the yaw-rate sensor are excited into a drive mode which induces an antiparallel, antiphase deflection of the two movable substructures along a shared axis.

The center of mass of this type of yaw-rate sensor advantageously remains fixed during one period of the primary oscillation. Neither a linear pulse nor an angular momentum is outcoupled by the yaw-rate sensor, thereby minimizing the energy exchange with the surroundings.

In another preferred specific embodiment, the yaw-rate sensor has four movable substructures that are coupled to one another via a central spring element and are excitable into a coupled oscillation mode in a plane that extends parallel to the substrate surface. In this context, the first and the second movable substructures execute an antiparallel oscillation in the direction of a first axis, while the third and the fourth movable substructures execute an antiparallel oscillation in the direction of a second axis that is oriented perpendicularly to the first axis.

The coupled oscillation mode of the yaw-rate sensor composed of four substructures is likewise advantageously excitable by a shared drive control circuit, whereby the space and power requirements of the electronic evaluation circuit are reduced.

In addition, the yaw-rate sensor composed of four substructures also has the advantage of a fixed center of mass for the duration of one oscillatory period. As a result, neither a linear pulse nor an angular momentum is outcoupled by the yaw-rate sensor.

A further advantage of the yaw-rate sensor composed of four substructures is the feasibility of integrating Coriolis elements for detecting yaw rates about all three spatial axes. Since the Coriolis force exerted on a Coriolis element acts perpendicularly to the drive direction of the Coriolis element and perpendicularly to the rotary axis of motion of a yaw rate, a yaw rate about a rotary axis of motion extending parallel to the drive direction of the Coriolis element does not produce a Coriolis force. Since the primary oscillation of the inventive yaw-rate sensor, which is composed of four movable substructures, has motion components in more than only one spatial direction, yaw rates may be detected about any given spatial axis.

In a further refinement of the preferred specific embodiment, at least two substructures that oscillate in phase opposition have identical Coriolis elements for detecting a yaw rate about the same axis. The opposite-phase primary oscillation of the substructures bearing the identical Coriolis elements advantageously induces an opposite-phase secondary oscillation of the Coriolis elements. This renders possible a fully differential analysis of the detection signal. In addition, the antiparallel drive and detection motion reduces the yaw-rate sensor's susceptibility to interference caused by occurring linear accelerations.

In another preferred specific embodiment, the Coriolis elements of a yaw-rate sensor are not only coupled in terms of a drive motion, but also in a detection mode. This advantageously prevents an unintentional splitting of the detection frequencies of the various Coriolis elements of the yaw-rate sensor.

The biaxial and triaxial yaw-rate sensors provided by the present invention may be advantageously manufactured cost-effectively and by mass production using standard surface micromachining processes.

BRIEF DESCRIPTION OF THE DRAWINGS

FIG. 7 shows a schematic representation of a drive mode of a yaw-rate sensor composed of four substructures.

FIG. 8 shows a schematic representation of a drive mode of a yaw-rate sensor composed of four substructures.

FIG. 9 shows a schematic representation of a biaxial yaw-rate sensor for detecting yaw rates about the x- and y-axis.

FIG. 17 shows a schematic representation of a triaxial yaw-rate sensor composed of six substructures.

DETAILED DESCRIPTION

Figure 1:
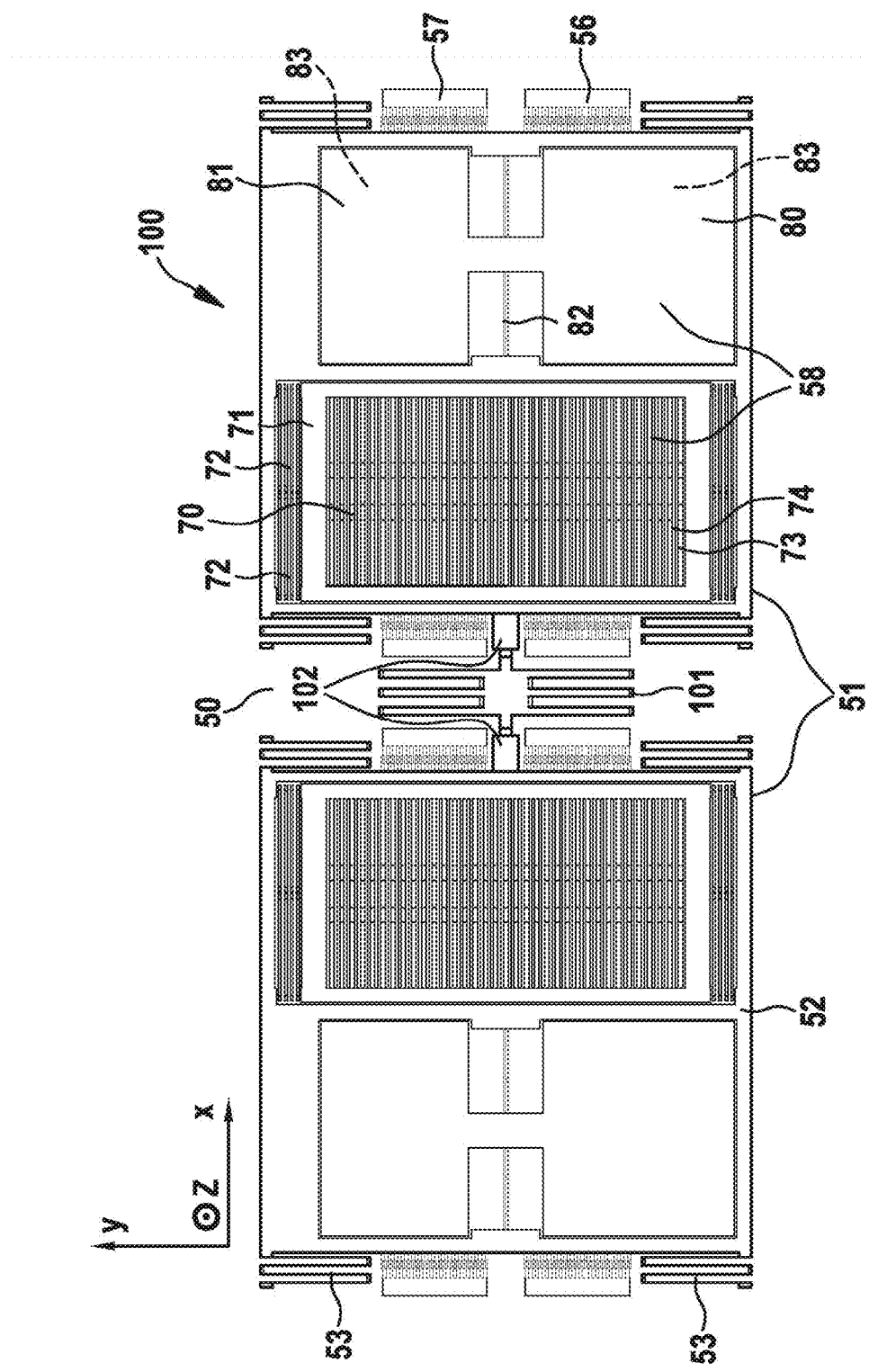
FIG. 1 shows a biaxial yaw-rate sensor for detecting yaw rates about the y- and z-axis.

FIG. 1 shows a view of a biaxial yaw-rate sensor 100. Yaw-rate sensor 100 includes two movable substructures 51 which are mounted over a substrate 50 that extends in the plane of the paper. The edge length of yaw-rate sensor 100 is a few hundred micrometers.

Movable substructures 51 are manufactured out of a material that, at the very bottom, has a thick silicon substrate upon which there is an oxide layer. Above the oxide layer, there is a polysilicon layer VP that forms a circuit trace plane. This is followed by another oxide layer OX, upon which a silicon layer EP is deposited, out of which the movable components of the yaw-rate sensors are manufactured. Recesses are provided at special sites in oxide layer OX. Connections between silicon layer EP and circuit trace plane VP are formed in these recesses during deposition of silicon layer EP. The sensor elements are then defined, and oxide layer OX is removed in an etching process. Self-supporting structures are thereby produced.

Each of movable substructures 51 has a drive frame 52. Drive frames 52 may have perforations, which are not shown in FIG. 1 for the sake of clarity. Each drive frame 52 is connected via four connecting flexural springs 53 to substrate 50. Connecting flexural springs 53 are designed as bar springs that are folded in a meander shape and are oriented in such a way that movable substructure 51 is movable in the x-direction extending in the plane of the paper, but, on the other hand, is fixed in all other spatial directions. Connecting flexural springs 53 may also have a different geometry which ensures a directionally dependent spring stiffness.

Drive frame 52 of each movable substructure 51 may be set into oscillation in the x-direction via two drive comb structures 56. Each drive comb structure 56 is composed of a part that is connected to substrate 50 and of a part that is connected to drive frame 52. Both parts of drive comb structure 56 have comb structures whose tines intermesh without contacting each other. Through the application of homopolar or oppositely poled voltage to both parts of a drive comb structure 56, a force in the x-direction may be exerted on a movable substructure 51, and movable substructure 51 may be set into oscillation. The oscillation of movable substructure 51 may be detected via two further capacitive, drive-detection comb structures 57 affixed to drive frame 42. The design of drive-detection comb structures 57 corresponds to that of drive comb structures 56. The two drive-detection comb structures 57 are preferably attached at opposite sides of movable substructure 51 to permit a differential detection of the drive oscillation.

At the outer edge facing the respective other drive frame 52, each drive frame 52 has a connecting piece 102. The two connecting pieces 102 are connected to a central connection spring 101. The two movable substructures 51 are thereby coupled via central connection spring 101. Central connection spring 101 is composed of two bars of substrate material that are folded in a meander shape. Central connection spring 101 may also have a different geometry.

The two movable substructures 51 have two Coriolis elements 58 each. Coriolis elements 58 have a substantially rectangular form. A first Coriolis element 58 of each movable substructure 51 is a grid-structure Coriolis element 70. A second Coriolis element 58 of each movable substructure 51 is a rocker-type Coriolis element 80. Coriolis elements 58 are mounted on movable substructures 51 in such a way that yaw-rate sensor 100 is mirror-symmetrical to a plane that is oriented perpendicularly to the surface of substrate 50, between movable substructures 51.

Grid-structure Coriolis element 70 has a frame 71. At two sides of frame 71 opposing one another in the y-direction, frame 71 is connected in each case via two flexural springs 72 to drive frame 52. The four flexural springs 72 that are folded in a meander shape are primarily extensible in the y-direction due to the orientation of their folds, while an oscillation of drive frame 52 in the x-direction is completely transmitted to frame 71 of grid-structure Coriolis element 70. The region of grid-structure Coriolis element 70 enclosed by frame 71 has movable electrodes 73. Fixed electrodes 74, which are connected to the subjacent circuit trace plane, are located in the empty spaces of the grid structure. Electrodes 73, 74 permit detection of a deflection of grid-structure Coriolis element 70 in the y-direction.

Rocker-structure Coriolis element 80 has a rocker element 81. Rocker element 81 is composed of two elements having a different mass that are configured side-by-side in the y-direction and are joined by a crosspiece. The crosspiece is connected on both sides to drive frame 52 via two torsion springs 82 that are oriented parallel to the x-axis. Moreover, there is no connection between rocker element 81 and drive frame 52. Torsion springs 82 allow rocker element 81 to rotate about an axis formed by torsion springs 82. Apart from the rotation about this axis that extends parallel to the x-axis, rocker-structure Coriolis element 80 ideally does not have any further degrees of freedom of movement relative to drive frame 52. An oscillation of movable substructure 51 in the x-direction is completely transmitted to rocker-structure Coriolis element 80. A detection electrode 83 is provided on substrate 50 underneath each of the two parts of rocker element 81. A rotation of rocker element 81 effects a change in the capacitance between detection electrodes 83 and rocker element 81, allowing it to be thereby differentially detected.

The drive frequency of drive comb structures 56 is preferably selected in a way that allows the two movable substructures 51 to be excited into an antiparallel oscillation in the x-direction, accompanied by antiphase deflection of the two movable substructures 51. Since the two movable substructures 51 are mutually symmetrical in form and essentially have the same mass, the center of mass of yaw-rate sensor 100 during one period of the antiparallel primary oscillation remains fixed. Thus, neither a linear pulse nor an angular momentum is outcoupled by yaw-rate sensor 100, thereby minimizing the energy exchange with the surroundings.

In response to the occurrence of a yaw rate about the z-axis, a Coriolis force acts in the y-direction on grid-structure Coriolis elements 70 of the first and second movable substructure 51. This Coriolis force induces a deflection of grid-structure Coriolis elements 70 in the y-direction which may be detected via movable electrodes 73 and electrodes 74 connected to substrate 50. Due to the opposite-phase oscillation of the two movable substructures 51, the Coriolis force acts in opposite directions on both grid-structure Coriolis elements 70. During the first half of an oscillatory period of movable substructures 51, a Coriolis force acts in the positive y-direction on first grid-structure Coriolis element 70, for example, while a Coriolis force acts in the negative y-direction on second grid-structure Coriolis element 70. During the next half of the oscillatory period, a Coriolis force acts in the negative y-direction on first grid-structure Coriolis element 70, while a Coriolis force acts in the positive y-direction on second grid-structure Coriolis element 70. Thus, a differential analysis of the deflections of grid-structure Coriolis elements 70 detected by electrodes 73, 74 is made possible. In this manner, any interference in yaw-rate detection due to linear accelerations possibly acting additionally on yaw-rate sensor 100 is suppressed.

In response to the occurrence of a yaw rate about the z-axis, a Coriolis force likewise acts in the y-direction on first and second movable substructure 51. However, a deflection of movable substructures 51 in the y-direction is suppressed forcefully enough due to connecting flexural springs 53 that feature y-direction stiffness. A Coriolis force also acts in the y-direction on rocker-structure Coriolis elements 80. However, a deflection of rocker-structure Coriolis elements 80 in the y-direction is likewise not possible, respectively is suppressed very forcefully, due to torsion springs 82 that feature y-direction stiffness. Moreover, a deflection in parallel to the substrate surface does not lead to any changes in capacitance at electrodes 83 connected to the substrate.

In response to the occurrence of a yaw rate about the y-axis, a Coriolis force acts in the z-direction on grid-structure Coriolis elements 80 of the first and second movable substructure 51. Due to the asymmetrical distribution of the mass of rocker element 81 of rocker-structure Coriolis elements 80 over the two sides of torsion springs 82, the Coriolis force acting in the z-direction induces a rotation of rocker elements 81 about the axis of torsion springs 82 that is oriented parallel to the x-axis. The rotation of rocker elements 81 may be detected as a function of changes in capacitance at detection electrodes 83. Due to the antiparallel oscillatory motion of the two movable substructures 51, the Coriolis force acts in opposite directions on both rocker-structure Coriolis elements and induces a rotation of the two rocker-structure Coriolis elements 80 in opposite directions of rotation. In this manner, the changes in the capacitance of detection electrodes 83 may be analyzed differentially, and any interference in yaw-rate detection due to linear accelerations possibly acting additionally on yaw-rate sensor 100 is suppressed.

In response to the occurrence of a yaw rate about the y-axis, a Coriolis force likewise acts in the z-direction on drive frame 52 of first and second movable substructure 51. However, a deflection of drive frame 52 in the z-direction is not possible due to connecting flexural springs 53 that feature z-direction stiffness. A Coriolis force also acts in the z-direction on rocker-structure Coriolis elements 70. However, a z-direction deflection of grid-structure Coriolis elements 70 is likewise not possible due to flexural springs 72 that feature z-direction stiffness.

Figure 2:
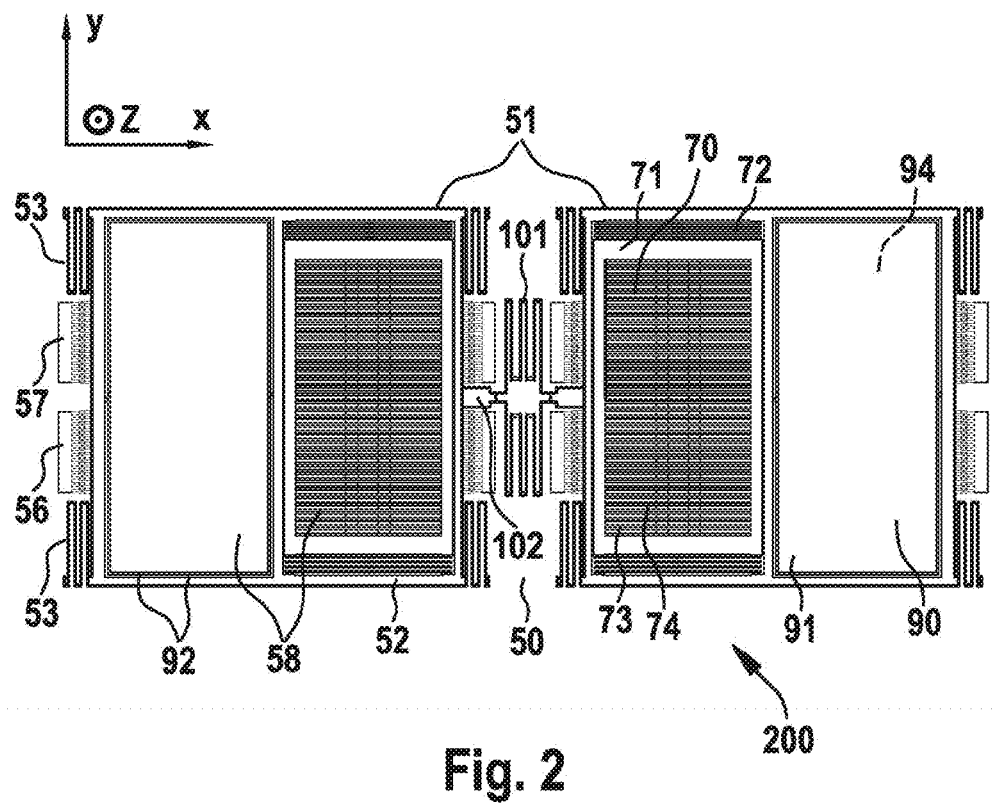
FIG. 2 shows a biaxial yaw-rate sensor for detecting yaw rates about the y- and z-axis.

FIG. 2 shows a schematic representation of a biaxial yaw-rate sensor 200. Yaw-rate sensor 200 differs from yaw-rate sensor 100 illustrated in FIG. 1 in that rocker-structure Coriolis element 80 is replaced by a trampoline-structure Coriolis element 90 in each of the two movable substructures 51.

Each of the two trampoline-structure Coriolis elements 90 has a substantially rectangular seismic mass 91. Seismic mass 91 is connected via four flexural springs 92 to drive frame 52 and is otherwise freely movable. Each flexural spring 92 engages approximately in the middle of a side edge of seismic mass 91, extends parallel to the side edge of seismic mass 91 within a gap between seismic mass 91 and drive frame 52 to approximately the middle of an adjacent side edge of seismic mass 91, and is connected there to drive frame 52. Flexural springs 92 advantageously feature x- and y-direction stiffness, so that seismic mass 91 is not able to be deflected toward drive frame 52 in the x- and y-directions. In the z-direction, flexural springs 92 permit a uniform, coplanar deflection of seismic mass 91 toward drive frame 52. A detection electrode 94 is provided on substrate 50 underneath seismic mass 91. A deflection of seismic mass 91 induces a change in capacitance at detection electrode 94, thereby permitting detection of the same.

In response to the occurrence of a yaw rate about the y-axis, a Coriolis force acts in the z-direction on the two trampoline-structure Coriolis elements 90 and induces a z-direction deflection of seismic masses 91. Due to the antiphase movement of the two movable substructures 51, the Coriolis force acts on the two trampoline-structure Coriolis elements 90 in opposite directions and induces an opposite deflection of the two seismic masses 91. Therefore, the deflection of the two seismic masses 91 may take place differentially by detection electrodes 94. As a result, yaw-rate sensor 200 is insensitive to interference caused by linear accelerations in the z-direction.

Figure 3:
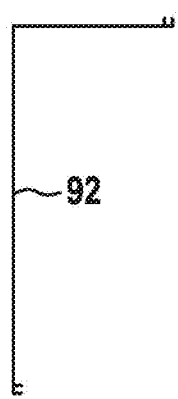
FIG. 3 shows a known micromechanical flexural spring.

FIG. 3 shows a schematic representation of a known kinked flexural spring 92 that may be used for suspending seismic mass 91 of a trampoline-structure Coriolis element 90. Flexural spring 92 is made of a single, long, narrow bar of silicon. In a middle region, the bar has a 90° kink. Provided at both ends of the bar at a 90° angle thereto are endpieces, via which flexural spring 92 may be connected to other micromechanical components, for example, to a seismic mass 91 and to a drive frame 52 of a trampoline-structure Coriolis element 90.

Figure 4:
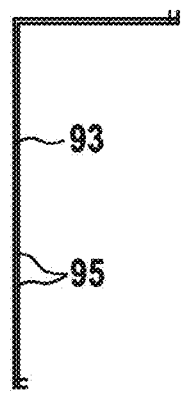
FIG. 4 shows a flexural spring designed as a ladder spring.

FIG. 4 shows a schematic representation of a ladder spring 93 that may likewise be used for suspending a seismic mass 91 in a trampoline-structure Coriolis element 90. Ladder spring 93 is composed of two parallel, long, narrow bars of silicon, which are joined multiple times over the length thereof by rungs 95 of silicon. The interspacing between two rungs 95 is greater than the distance between the two parallel bars of ladder spring 93. In a middle region, ladder spring has a 90° kink. Provided at both ends of ladder spring 93 at a 90° angle thereto are endpieces, via which ladder spring 93 may be connected to other micromechanical components, for example, to a seismic mass 81 and to a drive frame 52 of a trampoline-structure Coriolis element 90. In comparison to flexural spring 92 from FIG. 3, ladder spring 93 has a substantially greater ratio of stiffness in the x- and y-direction to the stiffness in the z-direction. This makes ladder spring 93 better suited for suspending seismic mass 91 of a trampoline-structure Coriolis element than flexural spring 92. Ladder spring 93 may also be used for any other given micromechanical components which require a spring element featuring anisotropic stiffness of the spring.

Figure 5:
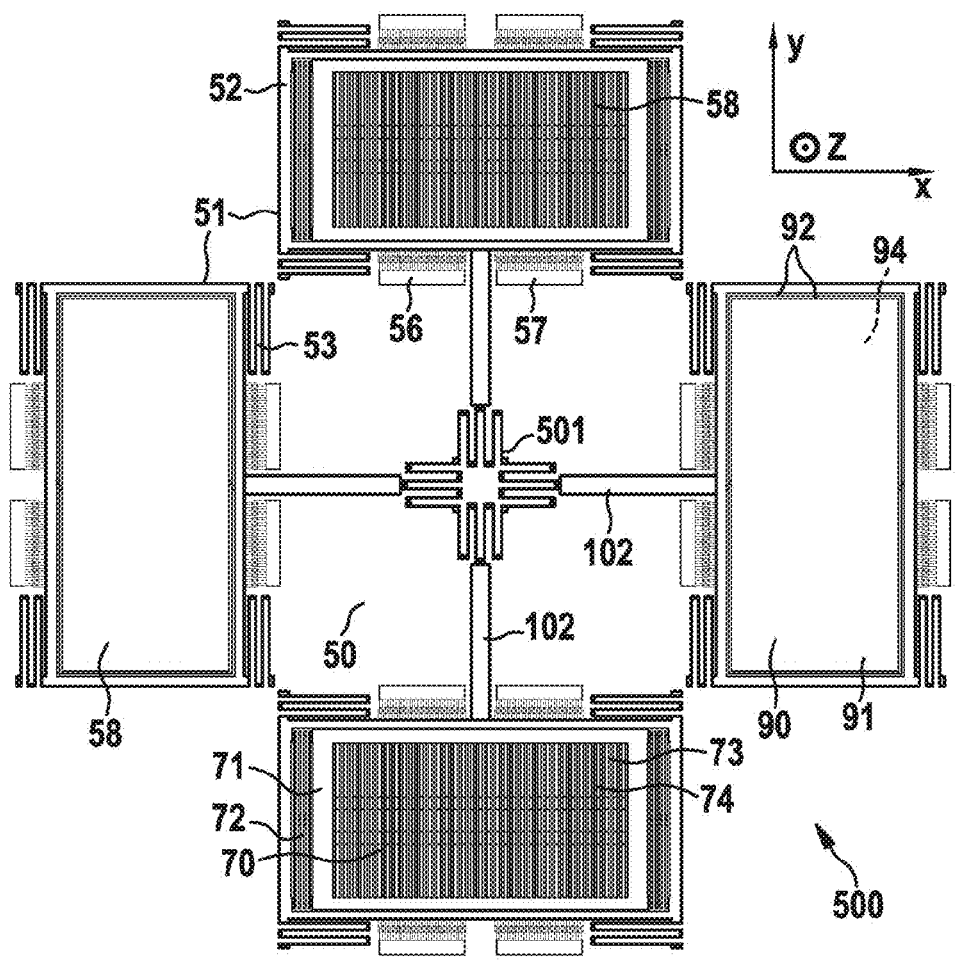
FIG. 5 shows a biaxial yaw-rate sensor for detecting yaw rates about the y- and z-axis.

FIG. 5 shows a schematic representation of another biaxial yaw-rate sensor 500 for detecting yaw rates about the y- and z-axis. Yaw-rate sensor 500 includes four movable substructures 51. The four movable substructures 51 are coupled via connecting pieces 102 to a central connection spring 501. Connection spring 501 is composed of a bar of substrate material that is folded in a meander shape. Connection spring 501 may also have a different design.

A first and a second movable substructure 51 are configured to permit excitation thereof into a coupled oscillation in the x-direction. A third and a fourth movable substructure 51 are configured to permit excitation thereof into a coupled oscillation in the y-direction. Central connection spring 501 couples the oscillation of first and second substructure 51 and the oscillation of third and fourth movable substructure 51 to one another. The four movable substructures 51 of yaw-rate sensor 500 may be excited into a common drive mode that induces a superimposed deflection of the four movable substructures 51 in the x- and y-direction. Two possible drive modes are schematically illustrated in FIGS. 7 and 8. The drive mode (breathing mode) 700 shown in FIG. 7 induces a simultaneous movement of all four movable substructures 51 toward central connection spring 501 or away therefrom. In drive mode (anti-breathing mode) 701 shown in FIG. 8, the two substructures 51 that are movable in the x-direction move in a first half of an oscillatory period toward central connection spring 501, while the two substructures 51 that are movable in the y-direction move away from central connection spring 501. In a second half of an oscillatory period, the two substructures 51 that are movable in the x-direction move away from central connection spring 501, while substructures 51 that are movable in the y-direction move toward central connection spring 501. Central connection spring 501 induces a frequency splitting of the two drive modes 700, 701 of yaw-rate sensor 500 illustrated in FIGS. 7 and 8. One of the two drive modes 700, 701 is selectively excitable in response to a defined introduction of force, in-phase, in the x- and y-direction by drive comb structures 56 provided on movable substructures 51 of yaw-rate sensor 500.

Unlike yaw-rate sensors 100, 200 illustrated in FIGS. 1 and 2, each of movable substructures 51 of yaw-rate sensor 500 illustrated in FIG. 5 features merely one Coriolis element 58. First and second substructures 51 that are movable in the x-direction each have a trampoline-structure Coriolis element 90. Third and fourth substructures 51 that are movable in the y-direction each have a grid-structure Coriolis element 70.

In response to the occurrence of a yaw rate about the y-axis, a Coriolis force acts in the z-direction on first and second substructures 51 that are movable in the x-direction and induces a deflection of seismic masses 91 of trampoline-structure Coriolis elements 90 in the direction of the z-axis. The antiparallel movement of first and second movable substructures 51 induces a deflection of seismic masses 91 in opposite directions and permits a differential analysis by detection electrodes 94 of trampoline-structure Coriolis elements 90.

In response to the occurrence of a yaw rate about the z-axis, a Coriolis force acts in the x-direction on third and fourth substructures 51 that are movable in the y-direction and induces a deflection of frames 71 of grid-structure Coriolis elements 70 along the x-axis. Due to the antiparallel movement of third and fourth movable substructures 51, frames 71 of both grid-structure Coriolis elements 70 are deflected in opposite directions, thereby permitting a differential analysis.

Figure 6:
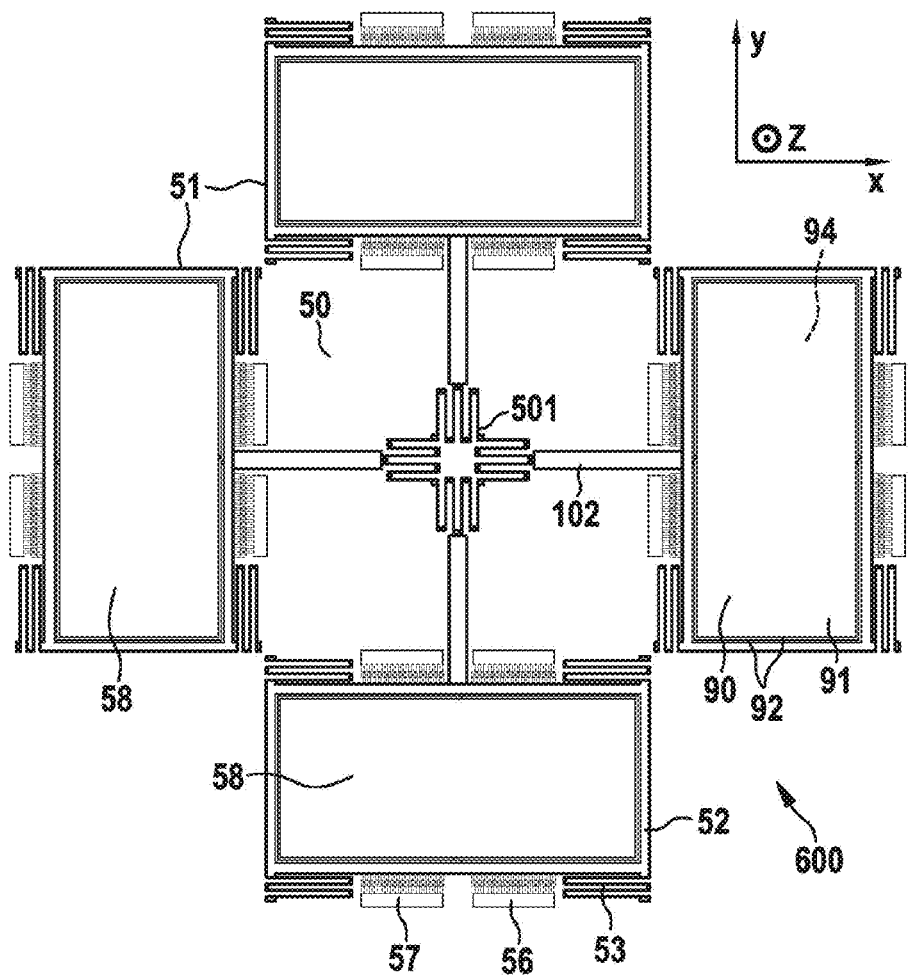
FIG. 6 shows a biaxial yaw-rate sensor for detecting yaw rates about the x- and y-axis.

FIG. 6 shows a schematic representation of a biaxial yaw-rate sensor for detecting yaw rates about the x- and y-axis. Yaw-rate sensor 600 differs from yaw-rate sensor 500 illustrated in FIG. 5 in that substructures 51 that are movable in the y-direction also have trampoline-structure Coriolis elements 90 instead of grid-structure Coriolis elements 70. In response to the occurrence of a yaw rate about the x-axis, a Coriolis force acts in the z-direction on substructures 51 that are movable in the y-direction and induces a deflection of seismic mass 91 of trampoline-structure Coriolis elements 90 in the direction of the z-axis. Due to the antiparallel movement of substructures 51 that are movable in the y-direction, the Coriolis force induces an opposite deflection of the two seismic masses 91 that may be differentially analyzed.

FIG. 9 shows a schematic representation of a biaxial yaw-rate sensor 900 for detecting yaw rates about the x- and y-axis. As does yaw-rate sensor 600 illustrated in FIG. 6, yaw-rate sensor 900 features four movable substructures 51 which each include a trampoline-structure Coriolis element 90. However, in comparison to FIG. 6, drive frames 52 of movable substructures 51 are replaced by two-piece drive frames 902. There is no connection between two-piece drive frames 902 and central connection spring 501. Instead, central connection spring 501 is connected via connecting pieces 901 to seismic masses 91 of trampoline-structure Coriolis elements 90. In addition, seismic masses 91 of trampoline-structure Coriolis elements 90 are connected to substrate 50 via additional connecting elements 903 on the side of each movable structure 51 facing away from central connection spring 501. The result of the coupling of seismic masses 91 via central connection spring 51 is that Coriolis elements 58 are not only coupled in terms of the drive motion, but also in the detection mode. In this exemplary embodiment, flexural springs 904, which connect seismic masses 91 to drive frame 902, have a U-shaped design.

Differences in the masses of two substructures 51 or in the spring stiffness of flexural springs 92 or 904 of two Coriolis elements 58 that are inherent in the process engineering may lead to an unwanted splitting of the detection frequencies of both Coriolis elements 58, resulting in different phase relations between the drive motion and the detection motion of Coriolis elements 58. A simple analysis of the two detection channels, for example, via a shared evaluation path in the multiplexing operation, is thereby made difficult since the signals must be detected at different phases. An electronic quadrature compensation is also significantly impeded. It is possible to overcome this problem by coupling the detection modes of Coriolis elements 58 of the four movable substructures 51.

Figure 10:
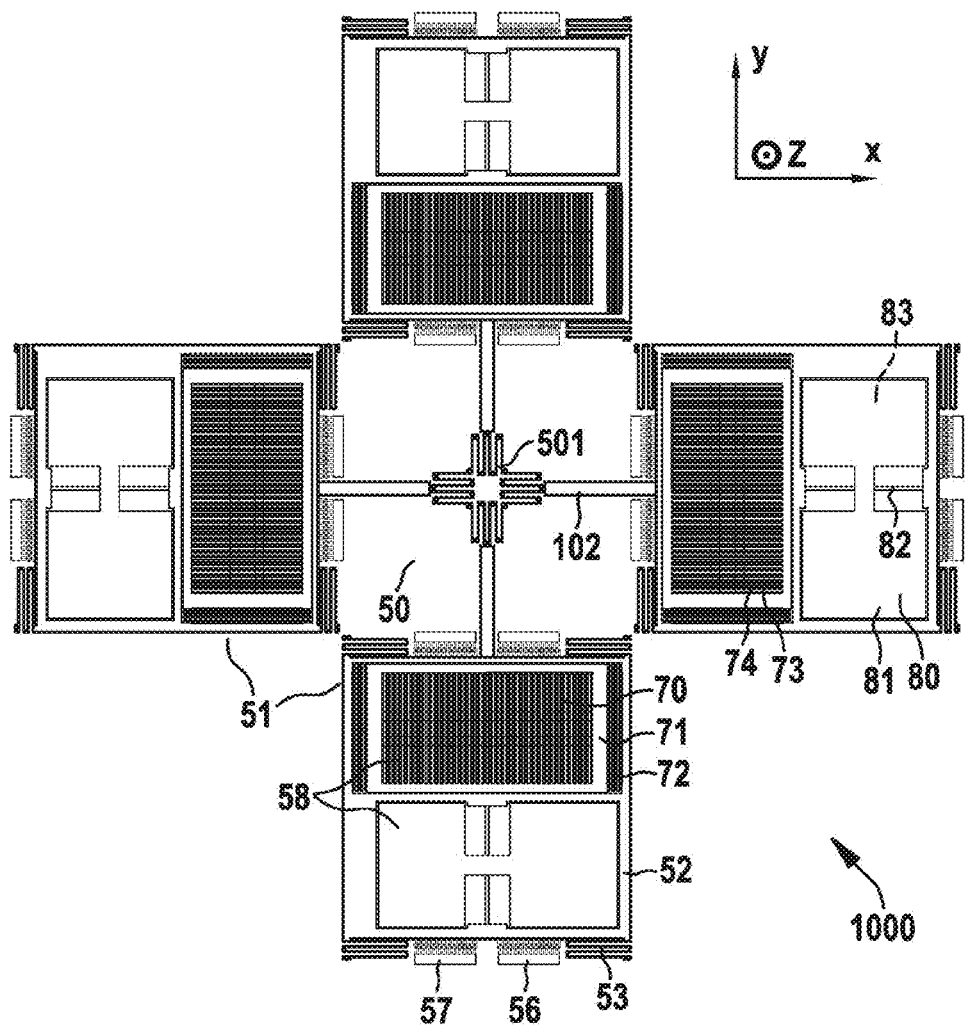
FIG. 10 shows a schematic representation of a triaxial yaw-rate sensor for detecting yaw rates about all three spatial axes.

FIG. 10 shows a schematic representation of a triaxial yaw-rate sensor 1000 for detecting yaw rates about the x-, y- and z-axis. As do yaw-rate sensors 500, 600 illustrated in FIGS. 5 and 6, triaxial yaw-rate sensor 1000 is composed of four movable substructures 51 which are coupled via connecting pieces 102 to a central connection spring 501. In contrast to yaw-rate sensors 500, 600, each movable substructure 51 of yaw-rate sensor 1000 has two Coriolis elements 58. Each movable substructure 51 includes a rocker-structure Coriolis element 80, as well as a grid-structure Coriolis element 70.

In response to the occurrence of a yaw rate about the y-axis, a Coriolis force acts in the direction of the z-axis on substructures 51 that are movable in the x-direction and induces a rotation of rocker elements 81 of rocker-structure Coriolis elements 80 of substructures 51, which are movable in the x-direction, about torsion springs 82 that are oriented parallel to the x-axis. The antiparallel movement of the two substructures 51 that are movable in the x-direction permits a differential analysis of the tilting of rocker elements 81 induced by the Coriolis force and thus a detection of a yaw rate about the y-axis.

In response to the occurrence of a yaw rate about the x-axis, a Coriolis force in the z-direction acts on substructures 51 that are movable in the y-direction and induces a rotation of rocker elements 81 of rocker-structure Coriolis elements 80 of substructures 51, which are movable in the y-direction, about torsion springs 82 that are oriented parallel to the y-axis. Due to the antiparallel movement of the two substructures 51 that are movable in the y-direction, a differential analysis of the rotation of rocker elements 81 is possible.

In response to the occurrence of a yaw rate about the z-axis, a Coriolis force in the y-direction acts on substructures 51 that are movable in the x-direction and induces a deflection of frames 71 of grid-structure Coriolis elements 70 of substructures 51, which are movable in the x-direction, in the direction of the y-axis. Due to the antiparallel movement of the two substructures 51 that are movable in the x-direction, a differential analysis of the deflection of frames 71 induced by the Coriolis force is possible.

In addition, in response to the occurrence of a yaw rate about the z-axis, a Coriolis force in the direction of the x-axis acts on substructures 51 that are movable in the y-direction and induces a deflection of frames 71 of grid-structure Coriolis elements 70 of substructures 51, which are movable in the y-direction, in the direction of the x-axis. Due to the antiparallel movement of the two substructures 51 that are movable in the y-direction, this deflection may also be differentially detected. Overall, therefore, four Coriolis elements 58 are available to determine a yaw rate about the z-axis.

Figure 11:
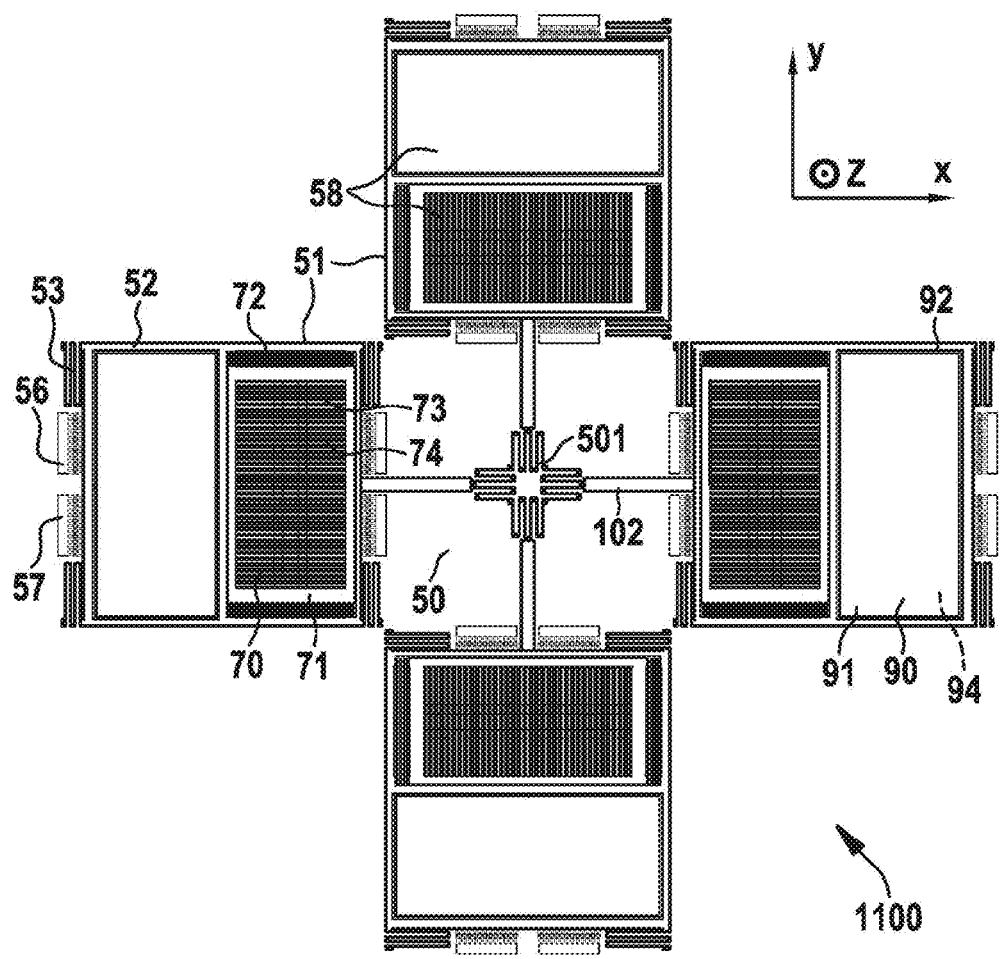
FIG. 11 shows a schematic representation of a triaxial yaw-rate sensor for detecting yaw rates about all three spatial axes.

FIG. 11 shows a schematic representation of another triaxial yaw-rate sensor 1100 for determining yaw rates about all three spatial axes. In comparison to yaw-rate sensor 1000 illustrated in FIG. 10, the four rocker-structure Coriolis elements 80 for determining yaw rates about the x- and y-axis are replaced by trampoline-structure Coriolis elements 90. These are likewise suited for differentially detecting yaw rates about the x- and y-axis.

Figure 12:
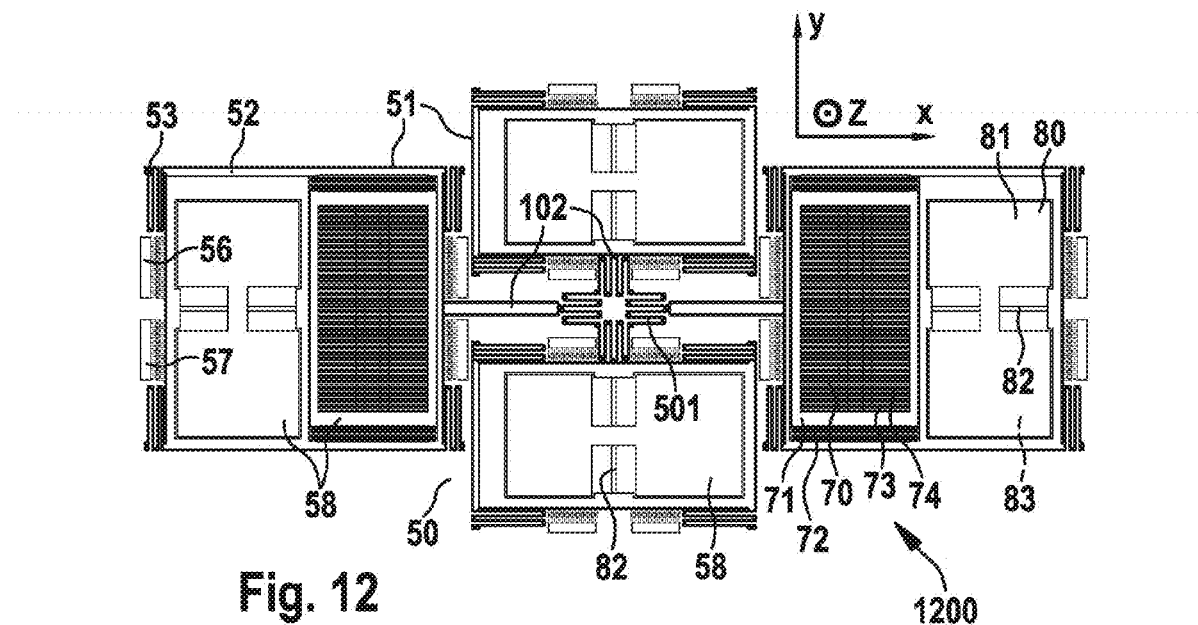
FIG. 12 shows a schematic representation of a triaxial yaw-rate sensor having reduced space requirements.

Triaxial yaw-rate sensors 1000, 1100 from FIG. 10, 11 feature more Coriolis elements 58 than needed for determining yaw rates about the z-axis. FIG. 12 shows a schematic representation of a triaxial yaw-rate sensor 1200 which, in design, resembles yaw-rate sensor 1000 in FIG. 10. Absent, however, in substructures 51 that are movable in the y-direction are grid-structure Coriolis elements 70. Thus, substructures 51 that are movable in the y-direction each include only one rocker-structure Coriolis element 80. Merely grid-structure Coriolis elements 70 of substructures 51 that are movable in the x-direction are used for detecting yaw rates about the z-axis. In addition, connecting pieces 102 between drive frames 52 of substructures 51 that are movable in the y-direction, and central connection spring 501 are significantly shortened compared to connecting pieces 102 between drive frames 52 of movable structures 51 that are movable in the x-direction, and central connection spring 501, so that substructures 51 that are movable in the y-direction are configured in the region of the surface of substrate 50 that is disposed between the substructures that are movable in the x-direction. This reduces the space requirements for yaw-rate sensor 1200.

Substructures 51 of yaw-rate sensor 1200 that are movable in the y-direction feature merely one Coriolis element 58 each, while substructures 51 of yaw-rate sensor 1200 that are movable in the x-direction include two Coriolis elements 58 each. As a result, substructures 51 that are movable in the y-direction have a smaller mass than substructures 51 that are movable in the x-direction. In one preferred specific embodiment, this mass differential is compensated by different spring stiffness levels of central connection springs 501 in the x- and y-direction. In this specific embodiment, central connection spring 501 has a lower spring stiffness in the y-direction than in the x-direction. The spring stiffness levels are selected to allow substructures 51 that are movable in the y-direction to execute an oscillation having a deflection amplitude comparable to that of substructures 51 that are movable in the x-direction. The stiffness of central connection spring 501 may be adjusted by varying the length and thickness of the individual spring members.

Figure 13:
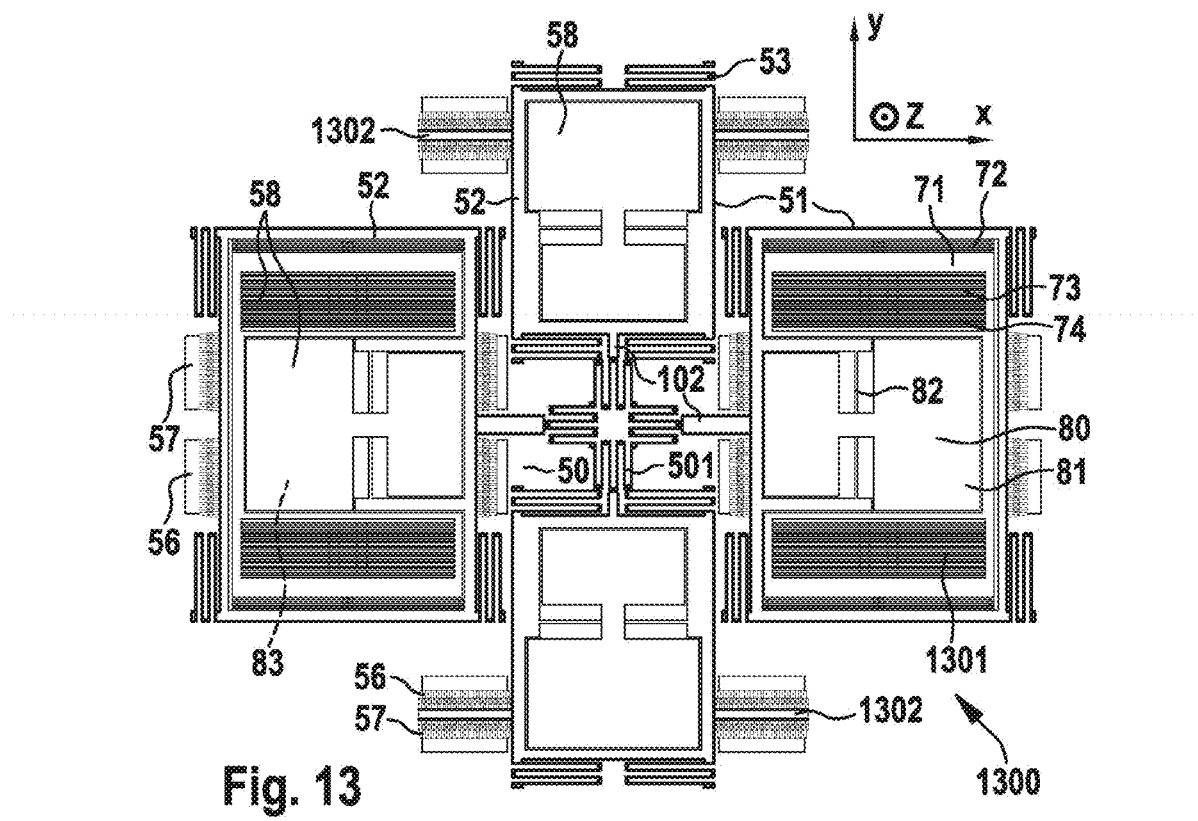
FIG. 13 shows a schematic representation of a triaxial yaw-rate sensor.

FIG. 13 shows a schematic representation of another triaxial yaw-rate sensor 1300 for detecting yaw rates about all three spatial axes. Yaw-rate sensor 1300 includes four movable substructures 51. Substructures 51 that are movable in the x-direction each feature two Coriolis elements 58 for detecting yaw rates about the y- and z-axis. Substructures 51 that are movable in the y-direction feature one Coriolis element 58 each for differentially detecting yaw rates about the x-axis.

Substructures 51 that are movable in the x-direction each have a two-piece grid-structure Coriolis element 1301 and a rocker-structure Coriolis element 80. The two-piece grid-structure Coriolis elements 1301 have a U-shape and surround rocker-structure Coriolis elements 80 without contacting the same. Due to this shape of two-piece grid-structure Coriolis element 1301, substructures 51 that are movable in the x-direction feature a symmetry with respect to a mirror plane that extends parallel to the x-axis. Rocker-structure Coriolis elements 80 of the two substructures 51 that are movable in the x-direction are used for differentially detecting yaw rates about the y-axis. The two two-piece grid-structure Coriolis elements 1301 of the two substructures 51 that are movable in the x-direction are used for differentially detecting yaw rates about the z-axis.

The two substructures 51 that are movable in the y-direction each have a rocker-structure Coriolis element 80. Compared to rocker-structure Coriolis elements 80 of substructures 51, that are movable in the y-direction, of yaw-rate sensor 1200 illustrated in FIG. 12, rocker-structure Coriolis elements 80 of substructures 51, that are movable in the y-direction, are rotated by 90°. As a result, substructures 51 that are movable in the y-direction feature both an inner symmetry with respect to a mirror plane that is parallel to the y-axis, as well as a symmetry to one another. The principle of operation of trampoline-structure Coriolis elements 90 is not altered by the configuration that is rotated by 90°.

At the side edges extending parallel to the y-axis, drive frames 52 of substructures 51 that are movable in the y-direction each feature a cantilever 1302. Drive comb structures 56 for driving substructures 51 that are movable in the y-direction, as well as capacitive drive-detection comb structures 57 for detecting the drive motion of substructures 51 that are movable in the y-direction are mounted on cantilevers 1302 of drive frames 52 of substructures 51 that are movable in the y-direction. Four connecting flexural springs 53 take up the entire side edges, extending parallel to the x-axis, of drive frames 52 of substructures 51 that are movable in the y-direction. This configuration of drive comb structures 56, of capacitive drive-detection comb structures 57, as well as of connecting flexural springs 53 allows smaller spatial dimensions of substructures 51 that are movable in the y-direction and thus reduces the surface-area requirement of triaxial yaw-rate sensor 1300.

Figure 14:
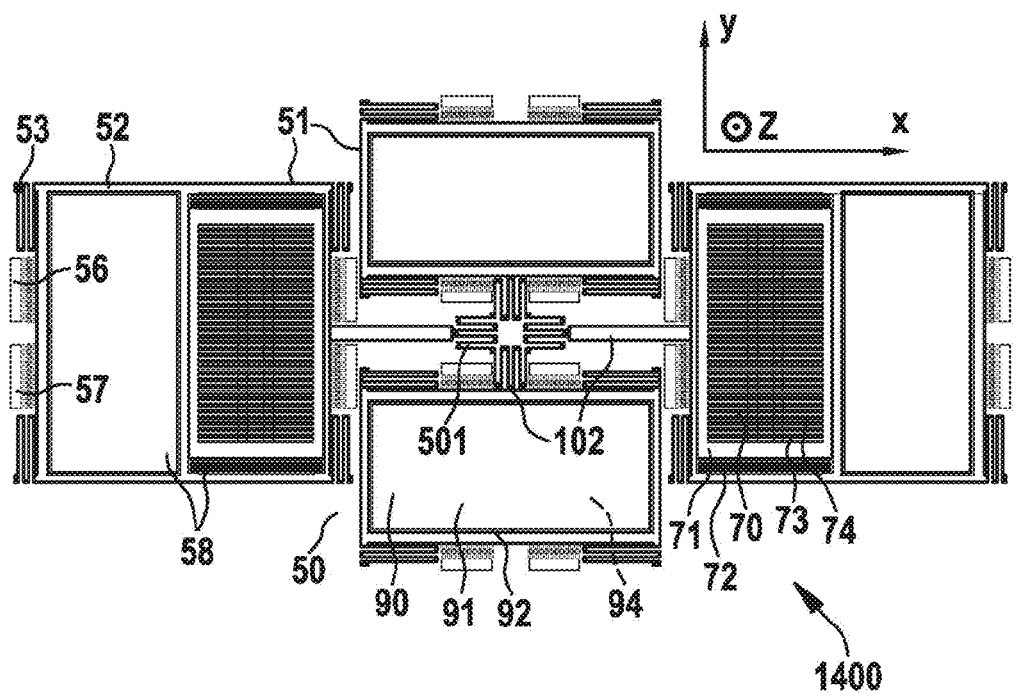
FIG. 14 shows a schematic representation of a triaxial yaw-rate sensor.

FIG. 14 shows another triaxial yaw-rate sensor 1400 for detecting yaw rates about all three spatial directions. Yaw-rate sensor 1400 corresponds to yaw-rate sensor 1200 shown in FIG. 12; in all four movable substructures 51, rocker-structure Coriolis element 80 having been replaced by a trampoline-structure Coriolis element 90. Trampoline-structure Coriolis elements 90 of substructures 51 that are movable in the y-direction permit a differential detection of yaw rates about the x-axis. Trampoline-structure Coriolis elements 90 of substructures 51 that are movable in the x-direction permit a differential detection of a yaw rate about the y-axis. Yaw-rate sensor 1400 features a greater symmetry than yaw-rate sensor 1200.

Figure 15:
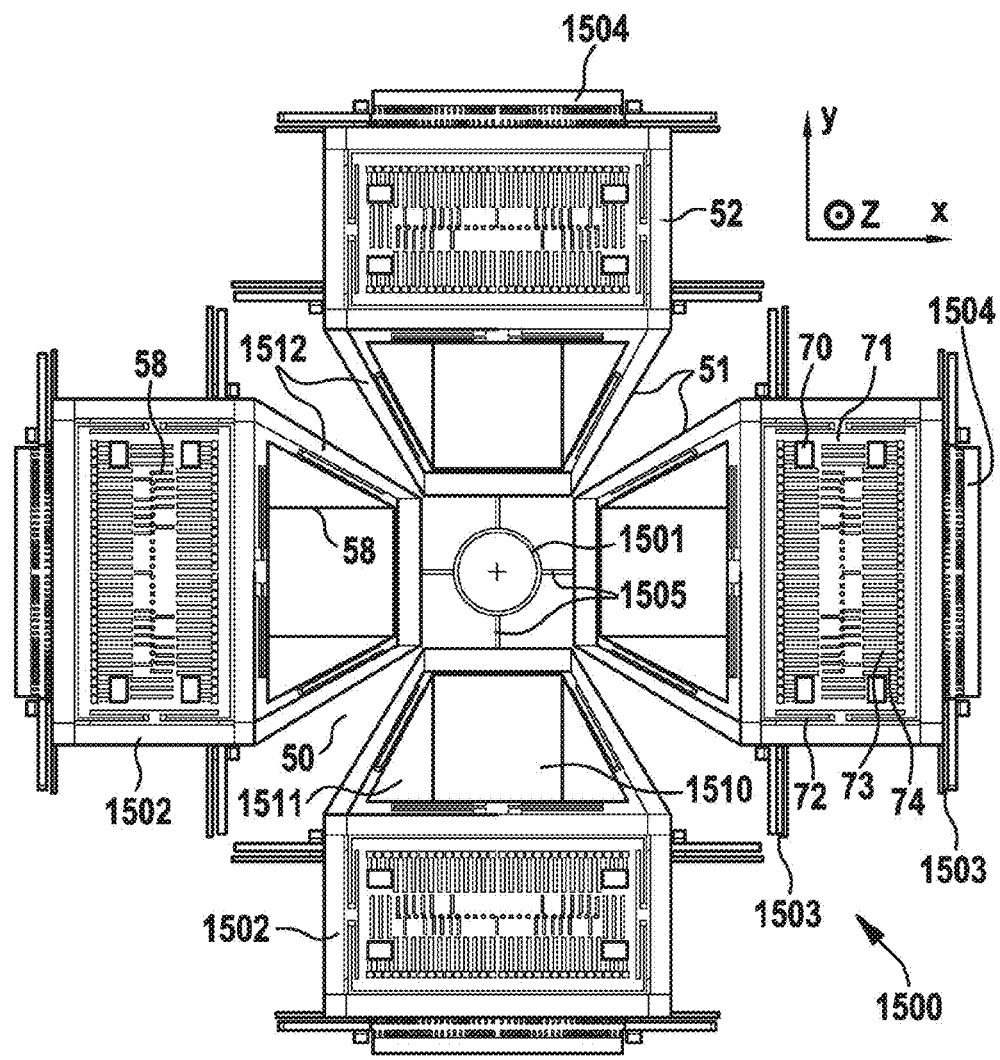
FIG. 15 shows a schematic representation of a triaxial yaw-rate sensor.

FIG. 15 shows another specific embodiment of a triaxial yaw-rate sensor 1500 for detecting yaw rates about the x-, y- and z-axis. Yaw-rate sensor 1500 includes four movable substructures 51. A central connection spring 1501, which is designed as a circular thin ring of substrate material, is located between movable substructures 51. Central connection spring 1501 is connected via four connecting pieces 1505 that are perpendicularly attached in each instance at a 90° interval to drive frames 1502 of the four movable substructures 51. Central connection spring 1501 may also have an elliptical shape to allow different spring stiffness levels in the x- and y-direction.

Each movable substructure 51 is connected via four connecting flexural springs 1503 to substrate 50. Connecting flexural springs 1503 of each movable substructure 51 are oriented in such a way that, in the direction of a first axis extending parallel to the surface of the substrate, movable substructure 51 is movably fastened in the direction of two axes extending perpendicularly thereto. A first and a second movable substructure 51 may be excited into an antiparallel oscillation in the x-axis direction. A third and a fourth movable substructure 51 may be excited into an antiparallel oscillation in the y-axis direction. To excite an oscillation, each of movable substructures 51 features a drive comb structure 1504 which is located at the side of drive frame 1502 facing away from central connection spring 1501 and takes up the entire side of drive frame 1502. In another specific embodiment, drive comb structure 1504 only takes up a portion of the side of drive frame 1502 and is supplemented by a drive-detection comb structure 57.

The four movable substructures 51 of yaw-rate sensor 1500 that are interconnected by central connection spring 1501 may be excited into a coupled oscillation in the x- and y-direction that induces a superimposed deflection of the four movable substructures 51 in the x- and y-direction. For example, drive modes 700, 701 schematically illustrated in FIGS. 7 and 8 may be excited.

Drive frames 1502 of the four movable substructures 51 feature a basic hexagonal shape. Each drive frame 1502 is composed of a rectangular part, to whose longitudinal side facing central connection spring 1501, the base of an equilateral trapezoid is joined. The rectangular part of drive frame 1502 of each movable substructure 51 has a grid-structure Coriolis element 70 for detecting a yaw rate about the z-axis. The trapezoidal part of drive frame 52 of each movable substructure 51 has a trampoline-structure Coriolis element 1510. Each trampoline-structure Coriolis element 1510 includes a trapezoidal seismic mass 1511 which is connected in each case via four flexural springs 1512 to drive frame 1502. Flexural springs 1512 are provided so as to allow seismic mass 1511 to follow a movement of drive frame 1502 in the x- and y-direction, while seismic mass 1511 may be deflected in the z-direction toward drive frame 1502. If a yaw rate about the y-axis is present, a Coriolis force acts in the direction of the z-axis on substructures 51 that are movable in the x-direction and induces a deflection of seismic masses 1511 of trampoline-structure Coriolis elements 1510 of substructures 51 that are movable in the x-direction along the z-axis. Due to the antiparallel movement of substructures 51 that are movable in the x-direction, seismic masses 1511 of the two substructures 51 that are movable in the x-direction are deflected in opposite directions and permit a differential detection of a yaw rate about the y-axis. The two trampoline-structure Coriolis elements 1510 of substructures 51 that are movable in the y-direction permit a differential determination of a yaw rate about the x-axis.

Figure 16:
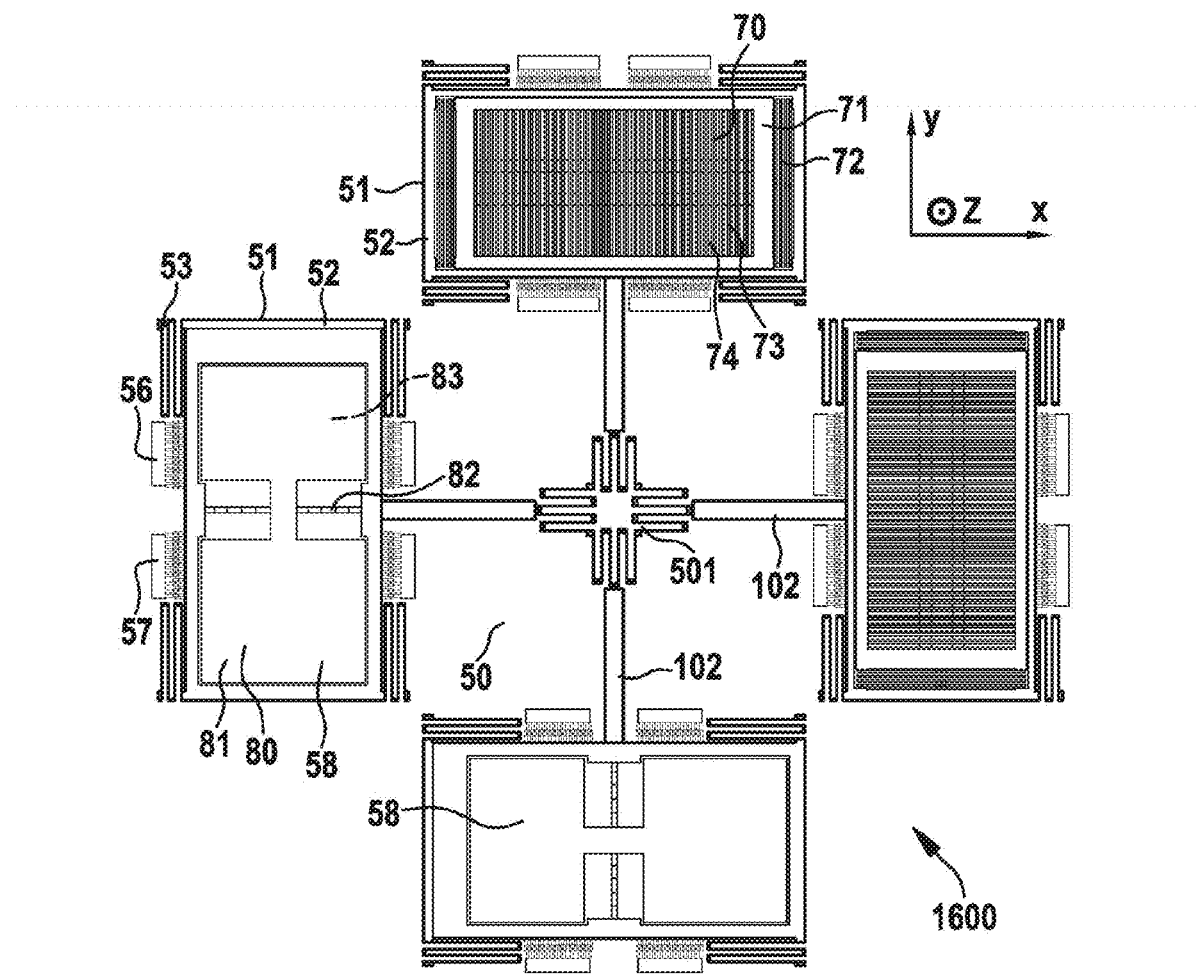
FIG. 16 shows a schematic representation of a triaxial yaw-rate sensor.

FIG. 16 shows another triaxial yaw-rate sensor 1600 for determining yaw rates about the x-, y- and z-axis. Yaw-rate sensor 1600 includes four movable substructures 51 which each feature a Coriolis element 58. In this context, one of substructures 51 that are movable in the x-direction has a rocker-structure Coriolis element 80; the other substructure 51 that is movable in the x-direction has a grid-structure Coriolis element 70. One of substructures 51 that are movable in the y-direction has a grid-structure Coriolis element 70; the other substructure 51 that is movable in the y-direction has a rocker-structure Coriolis element 80.

If the four movable substructures 51 of triaxial yaw-rate sensor 1600 are excited into a common drive mode, then the two grid-structure Coriolis elements 70 permit a differential detection of a yaw rate about the z-axis. Rocker-structure Coriolis element 80 of first substructure 51 that is movable in the x-direction permits a detection of a yaw rate about the y-axis. Rocker-structure Coriolis element 80 of second substructure 51 that is movable in the y-direction permits a detection of a yaw rate about the x-axis.

Since each of the four movable substructures 51 of triaxial yaw-rate sensor 1600 has only one Coriolis element 58, yaw-rate sensor 1600 requires less surface area than yaw-rate sensor 1000 illustrated in FIG. 10. However, antiparallel oscillating substructures 51 are not mutually symmetrical. It is possible to compensate for the different masses of Coriolis elements 58 of the two antiparallel oscillating substructures 51 by properly selecting the masses of drive frames 52 of the two antiparallel oscillating substructures 51.

FIG. 17 shows a schematic representation of a triaxial yaw-rate sensor 1700 which is composed of six movable substructures 51. Four movable substructures 51 of yaw-rate sensor 1700 form a biaxial yaw-rate sensor whose design corresponds to that of yaw-rate sensor 600 illustrated in FIG. 6. For the sake of clarity, only some of connecting flexural springs 53 are shown, and neither drive comb structures 56 nor capacitive drive-detection comb structures 57 are included in the illustration. Two additional movable substructures 51, which are rotated by 45° relative to first four movable substructures 51, are configured on two sides of central connection spring 501 and are likewise connected via connecting pieces 102 to central connection spring 501. The six movable substructures 51 may be excited into a common oscillation mode.

The first four movable substructures 51 each have a trampoline-structure Coriolis element 90. Substructures 51 that are movable in the x-direction permit a differential detection of a yaw rate about the y-axis. Substructures 51 that are movable in the y-direction permit a differential detection of a yaw rate about the x-axis. The two additional substructures 51 that are diagonally movable in the x-y plane each have a grid-structure Coriolis element 70 and permit a differential detection of a yaw rate about the z-axis.

What is claimed is:

1. A yaw-rate sensor comprising:
a substrate and a plurality of movable substructures that are mounted over a surface of the substrate, the movable substructures having Coriolis elements that are directly connected to a shared spring element;
means for exciting the movable substructures into a coupled oscillation in a plane that extends parallel to the surface of the substrate;
means for detecting deflections of the Coriolis elements caused by a Coriolis force;
wherein:
the Coriolis elements include:
a first Coriolis element for detecting a yaw rate about a first axis; and
a second Coriolis element for detecting a yaw rate about a second axis;
the second axis is not oriented parallel to the first axis;
each of the Coriolis elements is connected via additional spring elements to a drive frame of a respective one of the substructures.

2. The yaw-rate sensor of claim 1, wherein a common center of mass of at least two movable substructures remains fixed during one oscillatory period.

3. The yaw-rate sensor of claim 1, wherein:
with respect to at least one of the Coriolis elements, the additional spring elements are flexural spring elements that exhibit a high level of stiffness in the direction of the oscillation of the substructure and a low level of stiffness in a second direction which is oriented perpendicularly to the direction of oscillation of the substructure, means being provided for detecting a deflection of the Coriolis element in the second direction, caused by a Coriolis force.

4. The yaw-rate sensor of claim 1, wherein:
with respect to at least one of the Coriolis elements, the additional spring elements are flexural spring elements that exhibit a high level of stiffness in directions that extend parallel to the surface of the substrate and a low level of stiffness in a second direction that extends perpendicularly to the surface of the substrate, means being provided for detecting a deflection of the Coriolis element in the second direction, caused by a Coriolis force.

5. The yaw-rate sensor of claim 1, further comprising means for exciting two movable substructures into an oscillation mode that essentially induces an antiphase deflection of the two movable substructures parallel to a single axis.

6. The yaw-rate sensor of claim 5, wherein the two movable substructures, which are excitable into a common oscillation mode accompanied by antiphase deflection, have one Coriolis element each, the two Coriolis elements being deflectable in opposite directions in response to a Coriolis force.

7. The yaw-rate sensor of claim 1, wherein four movable substructures are provided, means being provided for exciting the four movable substructures into a coupled oscillation mode, which essentially induces an antiphase deflection of a first and of a second movable substructure along a first axis, and which essentially induces an antiphase deflection of a third and of a fourth movable substructure along a second axis.

8. The yaw-rate sensor of claim 7, further comprising means for exciting an oscillation mode whereby the deflection of the first and second movable substructure proceeds in phase with the deflection of the third and fourth movable substructure.

9. The yaw-rate sensor of claim 7, further comprising means for exciting an oscillation mode whereby the deflection of the first and second movable substructure proceeds in phase opposition to the deflection of the third and fourth movable substructure.

10. The yaw-rate sensor of claim 7, wherein:
the first and the second movable substructure have a substantially identical first mass;
the third and the fourth movable substructure have a substantially identical second mass;
the shared spring element has a first spring stiffness in the direction of the first axis;
the shared spring element has a second spring stiffness in the direction of the second axis; and
the first mass, the second mass, the first spring stiffness and the second spring stiffness are selected in such a way that the four movable substructures are excitable into an oscillation mode having substantially the same deflection amplitude for all four movable substructures.

11. The yaw-rate sensor of claim 7, wherein the third and the fourth movable substructures are mounted on the surface of the substrate in such a way that a portion of the surface of the third and fourth movable substructures covers a region of the surface of the substrate that resides between the first and the second movable substructure.

12. The yaw-rate sensor of claim 1, wherein:
the shared spring element is composed of a plurality of tines and connecting elements;
each tine includes a first kink extending 90° counterclockwise, a first straight section of a first length, a second kink extending 90° clockwise, a second straight section of a second length, a third kink extending 90° clockwise, and a third section of the first length;
each connecting element has a fourth kink 90° counterclockwise and a fourth section of a third length;
each tine is followed by either a connecting element or another tine;
a tine follows each connecting element; and
the spring element forms a closed ring.

13. The yaw-rate sensor of claim 1, wherein the shared spring element is designed as a ring, the movable substructures being coupled to the shared spring element via connecting pieces that are joined to the ring.

14. The yaw-rate sensor of claim 1, wherein the movable substructures are coupled to a shared, central spring element and wherein the second axis is oriented perpendicular to the first axis.

* * * * *